(12) United States Patent
Duerk et al.

(10) Patent No.: US 7,685,350 B2
(45) Date of Patent: Mar. 23, 2010

(54) REMOTE NODE INDEX MAPPING MECHANISM FOR SERIAL ATTACHED STORAGE DEVICES

(75) Inventors: Vicky P. Duerk, Shrewsbury, MA (US); Pak-Iung Seto, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/166,562

(22) Filed: Jun. 24, 2005

(65) Prior Publication Data

US 2006/0294286 A1 Dec. 28, 2006

(51) Int. Cl.
*G06F 13/42* (2006.01)
*G06F 3/00* (2006.01)
*G06F 13/36* (2006.01)

(52) U.S. Cl. .............................. 710/306; 710/3; 710/5; 710/105

(58) Field of Classification Search .................. 710/306
See application file for complete search history.

(56) References Cited

U.S. PATENT DOCUMENTS

| | | | | |
|---|---|---|---|---|
| 7,190,696 | B1 * | 3/2007 | Manur et al. | 370/392 |
| 7,584,319 | B1 * | 9/2009 | Liao et al. | 710/317 |
| 2004/0205259 | A1 * | 10/2004 | Galloway | 710/3 |
| 2006/0015654 | A1 * | 1/2006 | Krantz et al. | 710/5 |
| 2006/0039405 | A1 * | 2/2006 | Day et al. | 370/469 |
| 2006/0039406 | A1 * | 2/2006 | Day et al. | 370/469 |
| 2006/0041672 | A1 * | 2/2006 | Day et al. | 709/230 |
| 2006/0041699 | A1 * | 2/2006 | Day et al. | 710/106 |

OTHER PUBLICATIONS

Liao et al., "T10/05-144r0 SAS-2 zoning", T10 Technical Committee (online), Apr. 19, 2005, XP-002413415, pp. 1-20.
Hoglund, "SAS Pathway Recovery Modification T10/02-256r1", T10 Technical Committee (online), Jul. 15, 2002, XP-002413376, pp. 1-4.
Elliott, "Serial Attached SCSI General Overview", HP Industry Standard Servers (online), Sep. 30, 2003, XP-002413375, pp. 32-53.
Evans, "Serial Attached SCSI Architecture: Part 2—The SAS Link Layer", Maxtor White Paper (online), Dec. 2003, XP-002413416, pp. 1-6.
Written Opinion and International Preliminary Report on Patentablility for PCT application PCT/US2006/025226 dated Dec. 24, 2007; 6 pages.
Liao, Heng. PMC-Sierra (HENG.LIAO@PMC-SIERRA.COM),: "T10/05-144r0 SAS-2 zoning" T10 Technical Committee, (Online) Apr. 19, 2005, XP002413415 Retrieved from the Internet: http://www.t10.org/ftp/t10/document.05/05-144r0.pdf. (retrieved on 2008-03-11-08).

(Continued)

*Primary Examiner*—Ryan M Stiglic
(74) *Attorney, Agent, or Firm*—Grossman, Tucker, Perreault & Pfleger, PLLC

(57) ABSTRACT

According to one embodiment, a host bus adapter (HBA) is disclosed. The HBA includes a first lookup table to retrieve a remote node index (RNI) based upon an address received from a remote device as a component of an open address frame, a second lookup table to retrieve a remote node context (RNC) based upon the RNI and connection management logic coupled to the second lookup table to control a connection between the HBA and the remote device based upon the RNC.

17 Claims, 3 Drawing Sheets

OTHER PUBLICATIONS

Office Action Received for European Patent Application 06813215.8-2212, mailed on Apr. 25, 2008; 7 pages.

International Search Report/Written Opinion for PCT Patent Application No. PCT/2006/025226, mailed on Jan. 23, 2007, 11 Pages.

International Preliminary Report on Patentability for PCT Patent Application No. PCT/2006/025226, mailed on Jan. 10, 2008, 7 Pages.

* cited by examiner

| Byte\Bit | 7 | 6 | 5 | 4 | 3 | 2 | 1 | 0 |
|---|---|---|---|---|---|---|---|---|
| 0 | INITIATOR PORT | PROTOCOL | | | ADDRESS FRAME TYPE (1h) | | | |
| 1 | FEATURES | | | | CONNECTION RATE | | | |
| 2 | (MSB) | | | | | | | |
| 3 | INITIATOR CONNECTION TAG | | | | | | | (LSB) |
| 4 | | | | | | | | |
| 11 | DESTINATION SAS ADDRESS | | | | | | | |
| 12 | | | | | | | | |
| 19 | SOURCE SAS ADDRESS | | | | | | | |
| 20 | COMPATIBLE FEATURES | | | | | | | |
| 21 | PATHWAY BLOCKED COUNT | | | | | | | |
| 22 | (MSB) | | | | | | | |
| 23 | ARBITRATION WAIT TIME | | | | | | | (LSB) |
| 24 | | | | | | | | |
| 27 | MORE COMPATIBLE FEATURES | | | | | | | |
| 28 | (MSB) | | | | | | | |
| 31 | CRC | | | | | | | (LSB) |

Figure 2

REMOTE NODE INDEX MAPPING MECHANISM FOR SERIAL ATTACHED STORAGE DEVICES

FIELD OF THE INVENTION

The present invention relates to computer systems; more particularly, the present invention relates to computer system interaction with hard disk drives.

BACKGROUND

Serial attached storage protocols, such as serial ATA (SATA) and serial SCSI (SAS) are becoming more prevalent for connecting hard drives to a computer system. In computer systems implementing such serial storage devices, one storage device in the system may communicate with others. For example, a device requesting data (referred to as the initiator device) may receive data from a target device.

Typically, communication between the devices may occur after an identification sequence and the establishing of connections between the devices. Once a connection is opened by a target device to an initiator device, the initiator may use an initiator connection tag (ICT) field in an open address frame to look up the remote node context for that particular target.

On the other hand, when a connection is opened by an initiator, the target does not get a tag to get the remote node context of the initiator. Typically this issue is resolved in firmware. However, the problem with handling device communication for this scenario is that real time handling requirements are added to the host CPU, thus slowing down the performance.

BRIEF DESCRIPTION OF THE DRAWINGS

The invention is illustrated by way of example and not limitation in the figures of the accompanying drawings, in which like references indicate similar elements, and in which:

FIG. 2 illustrates one embodiment of an Open Address Frame; and

DETAILED DESCRIPTION

A mechanism for an initiator device address to remote node indexing is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
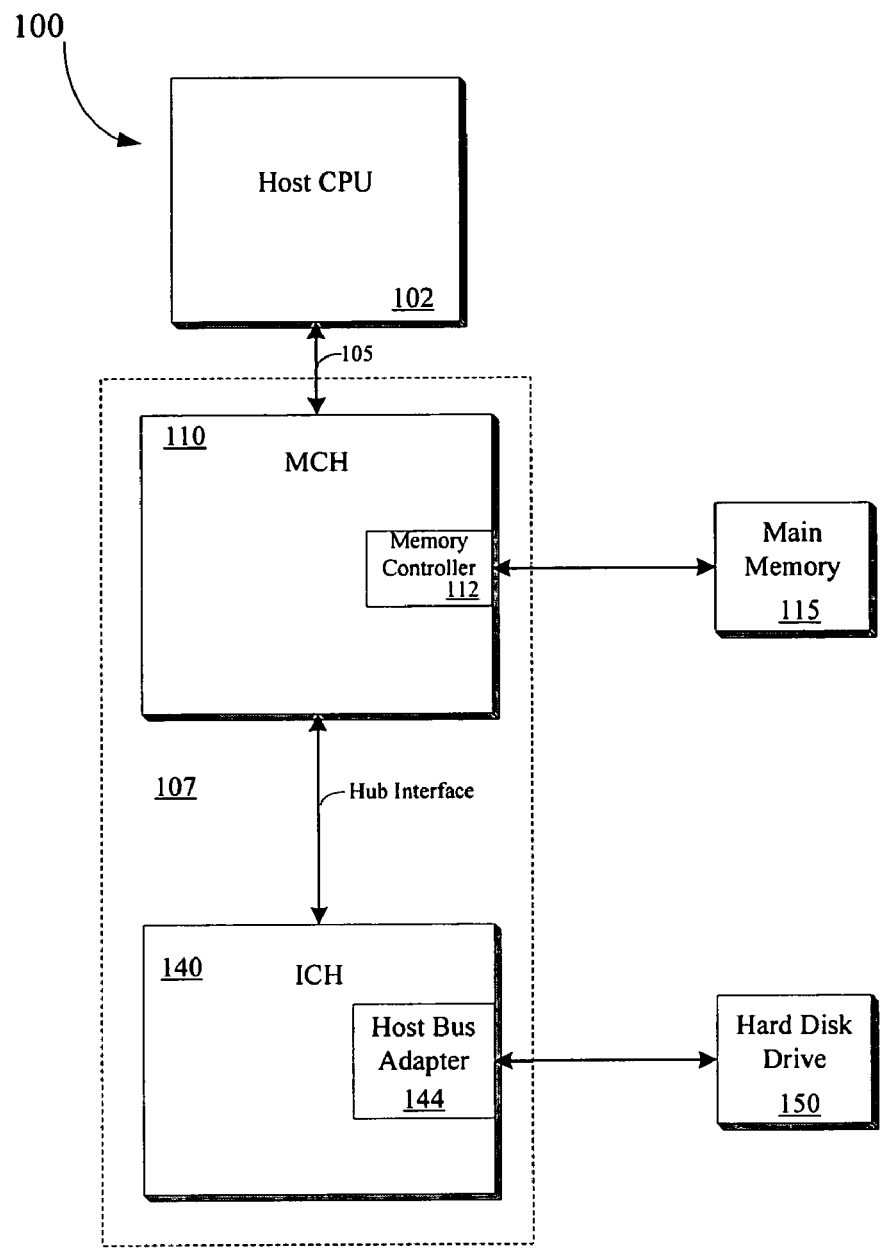
FIG. 1 is a block diagram of one embodiment of a computer system.

FIG. 1 is a block diagram of one embodiment of a computer system 100. Computer system 100 includes a central processing unit (CPU) 102 coupled to an interface 105. In one embodiment, CPU 102 is a processor in the Pentium® family of processors Pentium® IV processors available from Intel Corporation of Santa Clara, Calif. Alternatively, other CPUs may be used. For instance, CPU 102 may be implemented using multiple processing cores. In other embodiments, computer system 100 may include multiple CPUs 102

In a further embodiment, a chipset 107 is also coupled to interface 105. Chipset 107 includes a memory control hub (MCH) 110. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to interface 105, such as multiple CPUs and/or multiple system memories.

MCH 110 is coupled to an input/output control hub (ICH) 140 via a hub interface. ICH 140 provides an interface to input/output (I/O) devices within computer system 100. ICH 140 may support standard I/O operations on I/O busses such as peripheral component interconnect (PCI), accelerated graphics port (AGP), universal serial bus (USB), low pin count (LPC) bus, or any other kind of I/O bus (not shown).

According to one embodiment, ICH 140 includes a host bus adapter (HBA) 144. HBA 144 serves as a controller implemented to control access to one or more hard disk drives 150. In one embodiment, hard disk drive 150 is a serial SCSI (SSP) drive. However in other embodiments, hard disk drive 150 may be implemented as other serial drives. Thus, HBA 144 is capable of controlling different device types.

As discussed above communication may occur between devices upon establishing a connection between an end device such as HBA 144 (device A), and another end device such as hard drive 150 (device B). As discussed above, HBA 144 may be coupled to multiple hard disk drives via different ports. Further, in other embodiments, HBA 144 may be coupled to an expander device, which is coupled to other storage devices.

Typically, a source device makes a request to establish a connection by transmitting an open address frame to the destination device. The format of an open address frame is illustrated in FIG. 2. The open address frame includes an INITIATOR PORT bit, a CONNECTION RATE field and an INITIATOR CONNECTION TAG field. The INITIATOR PORT bit is set to one to specify that the source port is acting as an initiator port. The INITIATOR PORT bit is set to zero to specify that the source port is acting as a target port.

The CONNECTION RATE field specifies the connection rate being requested between the source and destination. The INITIATOR CONNECTION TAG (ICT) field is used for SSP and STP connection requests to provide a SAS initiator port an alternative to using the SAS target port's SAS address for context lookup when the SAS target port originates a connection request.

When a device (e.g., device A) needs to communicate with another device (e.g., device B), device A builds an open address frame with its address as the source address and the address of device B as the destination SAS address. If device A needs to open the connection to transmit command frames to device B, device A acts as an initiator. Therefore, device A sets the INITIATOR PORT bit to 1 in the open address frame. In this scenario, device A is the source, and device B is the destination. Device A is the initiator, and device B is the target.

In this scenario, device A opens a connection to device B. Device A retrieves a remote node context (RNC) that includes information related to the remote node, in this case device B.

Typically, firmware has previously assigned a remote node index (RNI) value to this remote node. Device A uses the RNI value to look up the RNC from a content addressable memory (CAM) that has been built by the firmware during discovery. This RNI value is used by device A to fill in the ICT field in the open address frame.

Another scenario may occur where, assuming connection in the above scenario has been closed, and device B wants to send data frames to device A. In this case device B builds an open address frame with its SAS address as the source address and SAS address of device A as the destination SAS address. Since device B is trying to open a connection back to device A assuming the initial role of the last connection, device B sets the INITIATOR PORT bit to zero in the open address frame.

In this case, device B is the source, and device A is the destination. Device A is still the initiator, and device B is still the target. Further, device A receives an open address frame from device B with INITIATOR PORT bit set to zero and assumes the initiator role. Device A uses the ICT field as the RNI number to look up the RNC from the CAM for connection management.

Another scenario may occur where the connection in scenario two described above is still open. Now if device B is to send command frames to device A, device B has to close the previous connection, forward a new open address frame with its SAS address as the source SAS address, device A's SAS address as the destination address, and INITIATOR PORT bit set to one. In this case, device B is the source, and device A is the destination. Device B is the initiator and device A is the target.

Device B attempts to open a connection to device A by sending an open address frame with INITIATOR PORT bit set to one. When device A receives the open address frame, device A does not have the RNI to look up the RNC for the remote node B that sent the open address frame.

According to one embodiment, HBA 144 includes hardware to enable Device A to locate the RNC for Device B when device A is in a target mode. Although described with respect to a HBA, one of ordinary skill in the art will appreciate that the embodiment described below may be implemented in any type of end point device.

Figure 3:
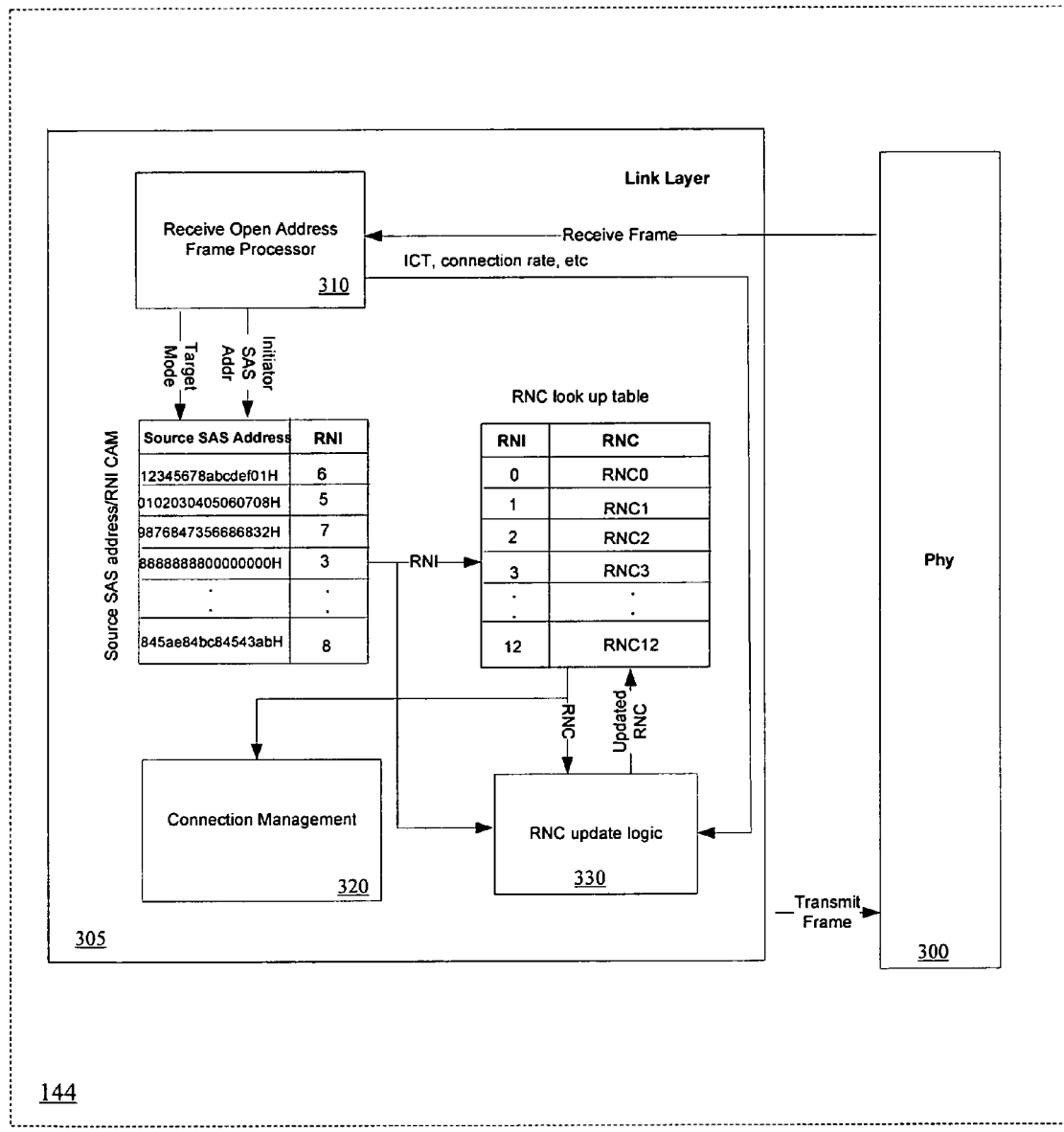
FIG. 3 illustrates one embodiment of a host bus adapter.

FIG. 3 illustrates one embodiment of HBA 144. HBA includes a Phy 300 and a link layer 305. Phy 300 includes transmitter and receiver circuitry that communicates with other devices via cables and connectors. Further, Phy 300 performs encoding schemes and the phy reset sequence. Link layer 305 controls communication for each available SAS link. Such communication includes an identification sequence, connection management, and frame transmission requested by the port layer (not shown).

Link layer 305 includes receive open address frame processor 310, connection management 320 and receive node context (RNC) update logic 330. In addition, link layer 305 includes a RNC lookup table and a source SAS address/RNI content addressable memory (CAM). Note that that other logic similar to a CAM may be implemented for SAS address/RNI lookup.

Open address frame processor 310 detects an open address frame and parses out the information in the open address. Further, open address frame processor 310 decodes the INITIATOR PORT field, and when set to one, outputs the initiator SAS address to the SAS address/RNI CAM.

The Source SAS address/RNI CAM is a look up table that takes the source SAS address as input, compares source SAS address with the addresses in the CAM, and outputs the corresponding RNI value to the RNC look up table. The RNC look up table is a remote node context information table that is indexed by RNI.

Connection management 320 controls the connection between device A and device B based upon the RNC contents received from the RNC lookup table. RNC update logic 330 receives the ICT and connection rate field from the open address frame and writes the information into to the RNC look up table in order to update the RNCs.

In operation, whenever device A receives an open address frame from device B, device A receive open address frame processor 310 extracts the fields in the open address frame. If the initiator port field is one, receive open address frame processor 310 generates a control signal to the source SAS address/RNI CAM along with the initiator SAS address.

For example, if the initiator SAS address is 8888888800000000H, the source SAS address/RNI CAM compares the address with its address list and outputs the RNI number 3 to the RNC look up table. The RNC look up table then uses 3 as an index to output RNC3 contents to the connection management logic 320. Connection management logic 320 then uses this information for connection control. RNC update logic 330 may take in the new ICT and connection rate from the open address frame and writes the information back to RNC3.

The above-described mechanism for automated connection management in target mode provides a hardware solution for a HBA design supporting target connection management. Thus, firmware RNC management is eliminated.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A host bus adapter (HBA) comprising:
    a processor to detect an open address frame received from a remote device and to extract a source address from the open address frame;
    a first lookup table to retrieve a remote node index (RNI) based upon the source address;
    a second lookup table to retrieve a remote node context (RNC) based upon the RNI; and
    connection management logic coupled to the second lookup table to control a connection between the HBA and the remote device based upon contents retrieved from the RNC.

2. The HBA of claim 1 further comprising update logic to receive an initiator connection tag (ICT) and connection rate information from the open address frame.

3. The HBA of claim 2 wherein the update logic writes the ICT and the connection rate information into the second lookup table to update the RNC.

4. The HBA of claim 1 wherein the processor decodes an initiator port field.

5. The HBA of claim 1 wherein the processor transmits a control signal to the first lookup table with the address of the remote device.

6. The HBA of claim 1 wherein the RNI is retrieved from the first lookup table whenever the HBA is operating in a target mode and the remote device is operating in an initiator mode.

7. A method comprising:
receiving an open address frame at a target device from an initiator device;
detecting, with a processor, the open address frame;
extracting, with the processor, a source address from the open address frame;
retrieving a remote node index (RNI) at a first lookup table based upon the source address; and
retrieving a remote node context (RNC) at a second lookup table based upon the RNI.

8. The method of claim 7 further comprising managing a connection with the initiator device based upon the RNC.

9. The method of claim 7 further comprising receiving an initiator connection tag (ICT) and connection rate information from the open address frame.

10. The method of claim 9 further comprising writing the ICT and the connection rate information into the second lookup table to update the RNC.

11. A system comprising:
a storage device; and
a host bus adapter (HBA), coupled to the storage device, having:
  a processor to detect an open address frame received from a remote device and to extract a source address from the open address frame;
  a first lookup table to retrieve a remote node index (RNI) based upon the source address;
  a second lookup table to retrieve a remote node context (RNC) based upon the RNI; and
  connection management logic coupled to the second lookup table to control a connection between the HBA and the remote device based upon contents retrieved from the RNC.

12. The system of claim 11 wherein the HBA further comprises update logic to receive an initiator connection tag (ICT) and connection rate information from the open address frame.

13. The system of claim 12 wherein the update logic writes the ICT and the connection rate information into the second lookup table to update the RNC.

14. The system of claim 11 wherein the processor decodes an initiator port field.

15. The system of claim 11 wherein the processor transmits a control signal to the first lookup table with the address of the remote device.

16. The system of claim 11 wherein the RNI is retrieved from the first lookup table whenever the HBA is operating in a target mode and the storage device is operating in an initiator mode.

17. The system of claim 11 further comprising a host central processing unit (CPU) coupled to the HBA.

* * * * *